US009681331B2

(12) United States Patent
Lindoff et al.

(10) Patent No.: US 9,681,331 B2
(45) Date of Patent: Jun. 13, 2017

(54) METHOD AND APPARATUS FOR DEVICE-TO-DEVICE TRANSMISSIONS

(71) Applicant: Telefonaktiebolaget L M Ericsson (publ), Stockholm (SE)

(72) Inventors: Bengt Lindoff, Bjärred (SE); Fredrik Gunnarsson, Linköping (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 195 days.

(21) Appl. No.: 14/261,948

(22) Filed: Apr. 25, 2014

(65) Prior Publication Data

US 2015/0223111 A1 Aug. 6, 2015

Related U.S. Application Data

(60) Provisional application No. 61/934,997, filed on Feb. 3, 2014.

(51) Int. Cl.
*H04W 28/04* (2009.01)
*H04W 24/02* (2009.01)
*H04W 72/02* (2009.01)

(52) U.S. Cl.
CPC ......... *H04W 28/048* (2013.01); *H04W 24/02* (2013.01); *H04W 72/02* (2013.01)

(58) Field of Classification Search
CPC .................................. G01R 27/06; H01Q 5/42
See application file for complete search history.

(56) References Cited

U.S. PATENT DOCUMENTS

| 9,055,512 B2* | 6/2015 | Pikkarainen .......... H04W 48/08 |
| 9,167,416 B2* | 10/2015 | Kim ........................ H04W 8/22 |
| 2010/0093364 A1 | 4/2010 | Ribeiro et al. |
| 2012/0250636 A1* | 10/2012 | Wang .................... H04W 72/08 370/329 |

FOREIGN PATENT DOCUMENTS

WO 2013123638 A1 8/2013

OTHER PUBLICATIONS

Third Generation Partnership Project, "3GPP TR 22.803 V12.2.0 (Jun. 2013)", 3rd Generation Partnership Project; Technical Specification Group Services and System Aspects; Feasibility study for Proximity Services (ProSe) (Release 12). Jun. 2013. pp. 1-45.

* cited by examiner

*Primary Examiner* — Chandrahas Patel
(74) *Attorney, Agent, or Firm* — Murphy, Bilak & Homiller, PLLC

(57) ABSTRACT

This disclosure presents a method and apparatus for mitigating interference arising from Device-to-Device, D2D, communications, in cases where the frequency band used for D2D transmissions is adjacent to an active cellular carrier or other frequency band carrying critical communications. Among the several mitigation techniques disclosed herein, a wireless device may reduce possible out-of-band interference arising from its D2D transmissions by adjusting transmit power and/or time/frequency resource allocations when it is determined that there is an interference risk. Such mitigations provide improved performance for the D2D transmissions and for the communications in the critical frequency band.

30 Claims, 6 Drawing Sheets

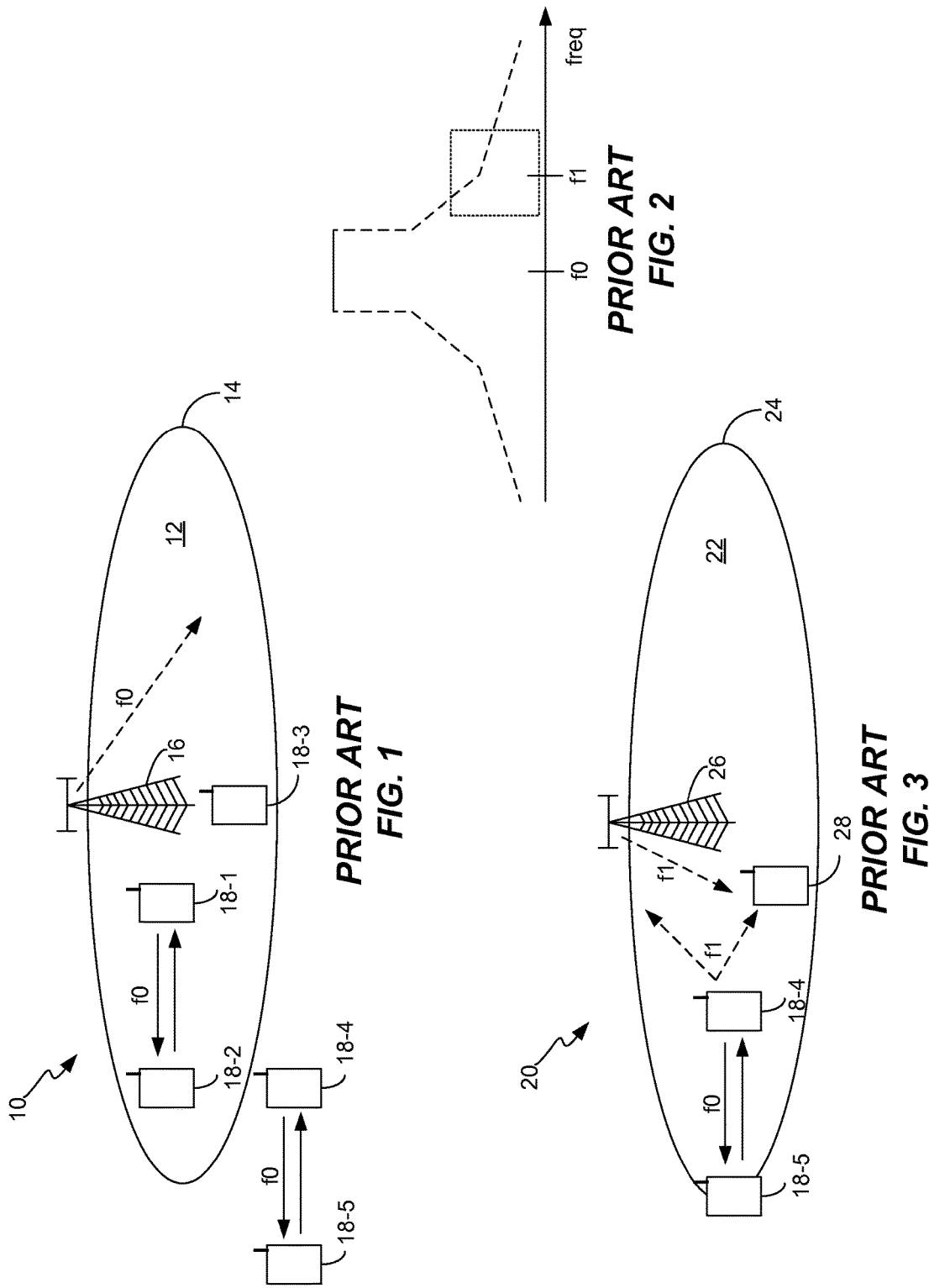

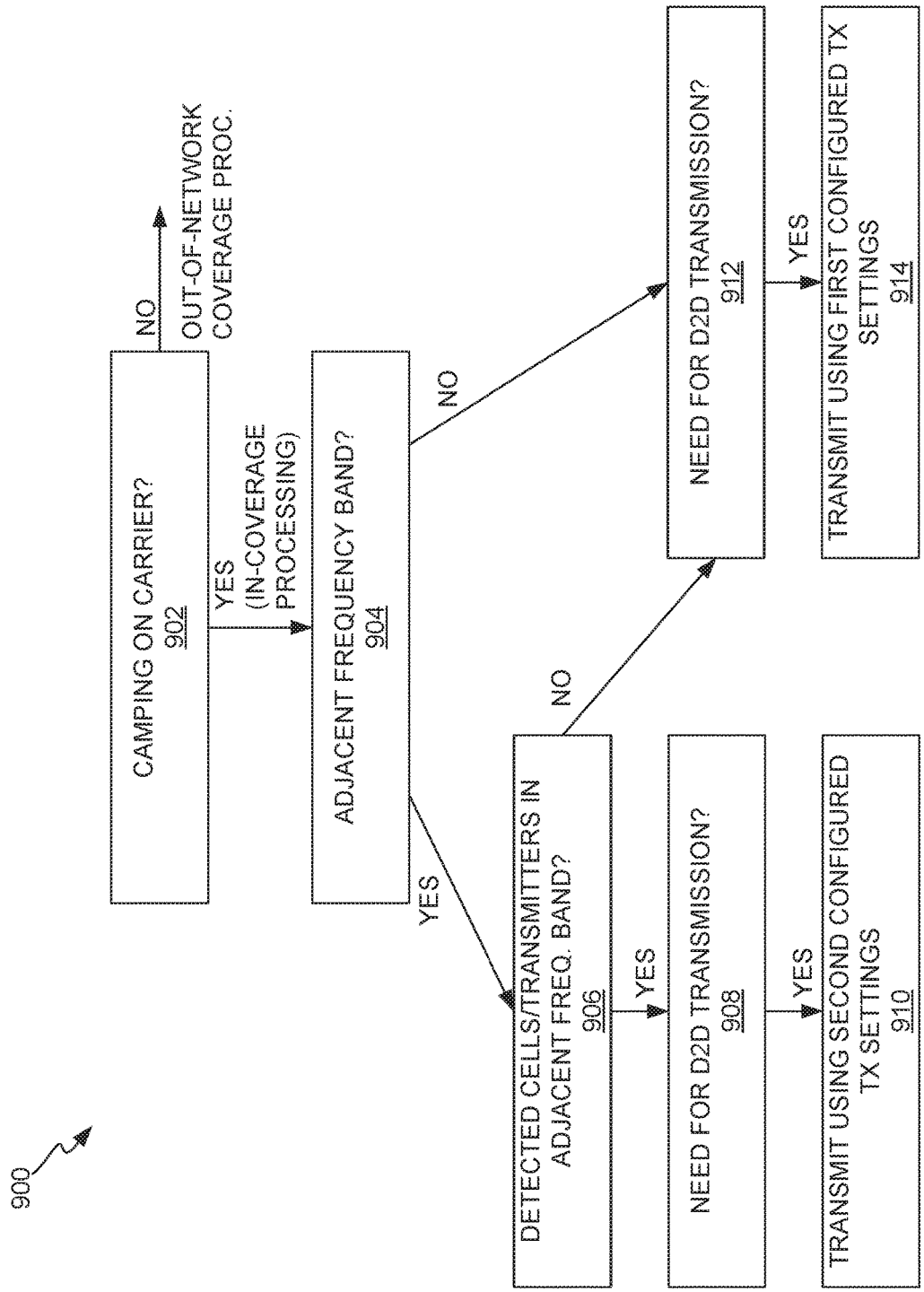

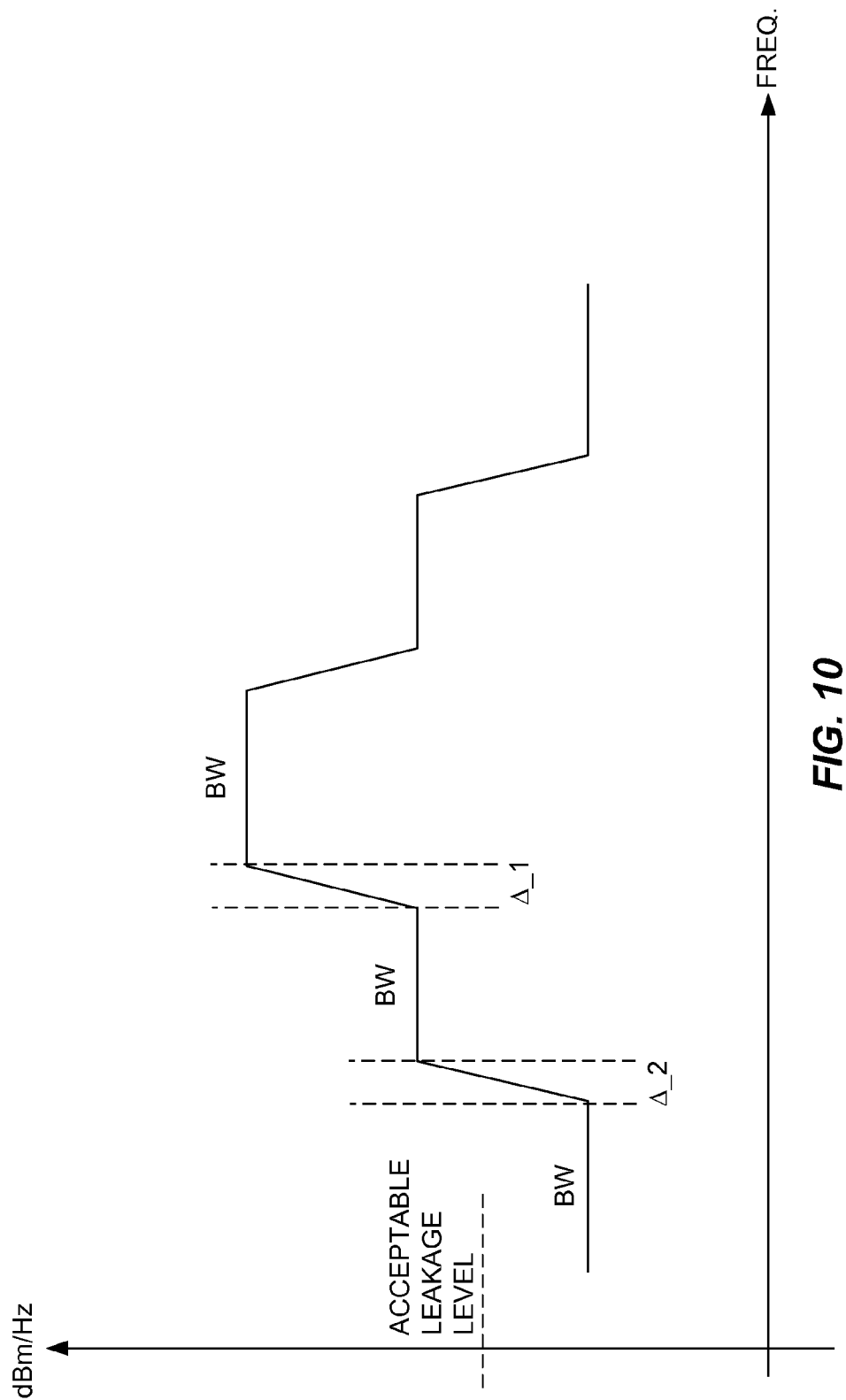

METHOD AND APPARATUS FOR DEVICE-TO-DEVICE TRANSMISSIONS

RELATED APPLICATIONS

This application claims priority under 35 U.S.C. 119 from U.S. Provisional Application No. 61/934,997 filed on 3 Feb. 2014, which is incorporated herein by reference in its entirety.

TECHNICAL FIELD

The present invention generally relates to wireless communications, and particularly relates to Device-to-Device, D2D, transmissions.

BACKGROUND

Although the idea of enabling D2D communications as a means of relaying in cellular networks was proposed by some early works on ad hoc networks, the concept of allowing local D2D communications to reuse cellular spectrum resources simultaneously with ongoing cellular traffic is relatively new. Because the non-orthogonal resource sharing between the cellular and the D2D layers has the potential of reuse gain and proximity gain, while at the same time increasing resource utilization, the use of D2D communications underlying cellular networks has received considerable interest in the recent years.

The Third Generation Partnership Project, 3GPP, has introduced D2D communications for Long Term Evolution, referred to as "LTE Direct". These types of D2D communications can be used in commercial applications, such as cellular network offloading, proximity based social networking, or in public safety situations in which first responders need to communicate with each other and with people in the disaster area. See the Technical Report identified as 3GPP TR 22.803, studying the feasibility of proximity services, "ProSe", using D2D communications.

D2D communication entities that use an LTE Direct link may reuse the same physical resource blocks, PRBs, as used for cellular communications either in the downlink or in the uplink or both. Those of ordinary skill in the art will recognize that PRBs comprise time/frequency resources allocable for multi-user service. The reuse of radio resources in a controlled fashion can lead to the increase of spectral efficiency, however such reuse comes at the expense of some increase in intra-cell interference.

Typically, D2D-communicating entities use uplink, UL, resources such as UL PRBs or UL time slots. However, it is possible that D2D communications, such as LTE Direct communications, take place in the cellular downlink, DL, spectrum or in DL time slots, and the teachings disclosed herein apply for UL and DL reuse. However, for ease of presentation, this disclosure assumes that D2D communication links use UL resources. For example, it is assumed that D2D communications reuse UL PRBs from a frequency-division duplexing, FDD, cellular communication system. For a time-division duplexing, TDD, cellular communication system, the D2D entities reuse UL time slots.

FIG. 1 illustrates a communication network 10 in which spectrum used by the network is reused for D2D communications, e.g., a frequency band or carrier frequency f0 is used by the network 10 and is reused at least partially for D2D communications. The network 10 has a coverage area 12 having a coverage border 14. While the network 10 may have multiple, overlapping coverage areas or cells, the diagram illustrates a single coverage area as a simplified basis for illustrating the principles of D2D communication within the LTE context.

A controlling node 16—such as an eNodeB or Cluster Head, CH—controls communications on a carrier having a frequency f_0. Here, a "CH" is a wireless device, such as a 3GPP user equipment, UE, which has control over a number of other wireless devices and acts as a base station with respect to those other device. However, the CH does not necessarily have a connection to the Internet or to a cellular system. In the diagram, wireless devices 18-1 and 18-2 communicate directly via a D2D link, while the wireless device 18-3 is not engaged in D2D communications. As both devices 18-1 and 18-2 are inside network, NW, coverage of the controlling node 16, the controlling node 16 allocates the radio resources used for D2D communication between the device 18-1 and 18-2.

In contrast, the wireless devices 18-4 and 18-5 communicate via D2D communication, but they are out of NW coverage. As a consequence, the devices 18-4 and 18-5 use pre-configured time/frequency resources, e.g., as pre-configured according to the controlling standards and/or based on device capabilities. In general, D2D communications may be "assisted D2D" that is carried out inside network coverage with the usual 3GPP meaning, or coverage from a cluster head, or may be "non-assisted" or "self-contained" D2D that is conducted outside of network coverage or coverage from a cluster head.

To maximize the coverage of D2D communication in NSPS scenarios, it is currently assumed that an NSPS device 18 may use higher output power than an ordinary LTE device 18 on dedicated NSPS frequency bands. The area in coverage of the NSPS base station is here termed an NSPS cell. Thus, in the example of FIG. 1, the coverage area 12 may be an NSPS cell, and the controlling node 16 may be an NSPS base station. Correspondingly, the proposed device transmission power, TX power, for NSPS operation is 31 dBm, as compared to the 23 dBm in the current cellular LTE standard.

Because the power amplifiers, PAs, used in such devices 18 typically are non-linear for high output powers, there will be spectral leakage—non-linear effects—outside the desired frequency band. FIG. 2 shows an example where a given device 18 transmits at a carrier frequency f0 at high power. Due to spectral leakage there will be emissions in adjacent and close frequency bands, e.g., affecting a carrier frequency f1. The carrier frequency f1 is considered to be a critical frequency band if it is standardized or otherwise known for use as a communication band, such as a cellular band, or an emergency, satellite, terrestrial broadcast, radar or military communications band. If one now assumes that there is active transmission on the f1 carrier, the spectral leakage may significantly interfere with that communication. Active transmissions in a critical frequency band will be referred to as critical transmissions.

See, for example, FIG. 3, which illustrates a cellular network 20 using a carrier frequency f1 that is adjacent to a carrier frequency f0 used for D2D communications. Here, "adjacent" may be bordering or immediately next to, but more broadly means close or nearby. The cellular network 20 provides one or more coverage areas 22 over which cellular communication services are provided on the f1 carrier frequency.

To the extent that devices 18 operating on a D2D link on the f0 carrier frequency are nearby or inside the coverage boundary 24 of the cellular communication network 20, the D2D transmissions may substantially interfere with the cellular transmissions between a base station 26 of the cellular communication network 20 and a wireless device 26 connected to that network 20. For example, FIG. 3 depicts wireless devices 18-4 and 18-5 communicating on a D2D link at the f0 carrier frequency and operating within the coverage area of the cellular communication network 20. Out-of-band leakage from the D2D transmissions causes interference in the f1 carrier frequency.

In one example relevant to the United States, 3GPP, NSPS is standardized for use in 3GPP Frequency Band 14—UL at 788 MHz-798 MHz—while ordinary, non-NSPS cellular communication may be deployed in 3GPP Band 13—UL at 777 MHz-787 MHz. Thus, the wireless devices 18-4 and 18-5 may have a D2D link in the 788-798 MHz frequency band, while ordinary cellular communication uplink between the base station 26 and wireless device 28 may be in the 777-787 MHz frequency range.

Conventional D2D transmission schemes do not provide interference mitigation with respect to critical frequency bands that are vulnerable to, e.g., out-of-band interference arising from D2D transmissions. Nor do existing D2D transmission schemes even provide a basis for recognizing when there are such interference risks. For example, it is recognized herein that with respect to the above scenario, there is only 1 MHz of separation between the lower extent of the D2D frequency band and the upper extent of the cellular frequency band. Thus, the cellular frequency band is "adjacent" in the sense that it is close to or nearby the D2D frequency band. Furthermore, there typically will be no coordination between emergency NSPS usage in Band 14 and ordinary cellular usage in Band 13. Hence significant uplink interference can be induced at the cellular radio base stations, which in turn may jeopardize the uplink coverage of the cellular system.

SUMMARY

This disclosure presents a method and apparatus for mitigating interference arising from Device-to-Device, D2D, communications, in cases where the frequency band used for D2D transmissions is adjacent to a critical frequency band. Among the several mitigation techniques disclosed herein, a wireless device may reduce possible out-of-band interference arising from its D2D transmissions by adjusting transmit power and/or time/frequency resource allocations when it is determined that there is an interference risk. Such mitigations provide improved performance for the D2D transmissions and for the communications in the critical frequency band.

One example embodiment comprises a method for selecting a transmission setting in a wireless device to use for D2D transmissions from the wireless device in a first frequency band. The method determining in a first case that there is not an interference risk from the D2D transmission with respect to a critical frequency band, and determining in a second case that there is an interference risk. In the first case, the method includes selecting a first transmission setting for the D2D transmission, and in the second case, the method includes selecting a second transmission setting for the D2D transmission. As compared to the first transmission setting, the second transmission setting is configured to reduce possible out-of-band interference arising from the D2D transmission.

In another example embodiment, a wireless device includes a transceiver circuit configured for D2D communications in first frequency band and further includes a processing circuit configured to select a transmission setting to use for a D2D transmission from the transceiver circuit. In particular, the processing circuit is configured to determine in a first case that there is not an interference risk from the D2D transmission with respect to a critical frequency band, and to determine in a second case that there is an interference risk. In the first case, the processing circuit is configured to select a first transmission setting for the D2D transmission, and, in the second case, select a second transmission setting for the D2D transmission. As compared to the first transmission setting, the second transmission setting is configured to reduce possible out-of-band interference arising from the D2D transmission.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a block diagram of a conventional communication network operating in a first frequency band and supporting Device-to-Device, D2D, communications between wireless devices operating in and out of network coverage.

FIG. 2 is a diagram of an example of spectral leakage from a D2D transmission at a carrier frequency f0 with respect to an adjacent critical frequency band at f0.

FIG. 3 is a block diagram of an example cellular communication network, wherein communications within a coverage area of the network are subject to interference from D2D transmissions in an adjacent frequency band.

FIGS. 8 and 9 are block diagrams of further example details for mitigating interference risks arising from D2D transmissions.

FIG. 10 is an example spectral leakage mask, as used for limiting out-of-band interference arising from D2D transmission.

DETAILED DESCRIPTION

The below description uses the term "wireless device" but this term should be given a broad construction. For example, the term encompasses user equipments or UEs, such as UEs configured for LTE operation, and broadly encompasses smartphones, tablets, laptops, modems, as well as machine type communication (MTC) devices, like sensors, etc.

According to the below description, a National Security Public Safety, NSPS, carrier supports Device-to-Device, D2D, service comprising direct communication with another device without communicating via a central node. These D2D communications may occur both inside network coverage, i.e., network-assisted D2D, as well as outside of network coverage. However, the teachings herein are not limited to NSPS carriers and the various references to NSPS carriers, networks, frequency bands, etc., should not be seen as limiting. Instead, the teachings herein shall be understood as applying to essentially any scenario where communications in a cellular communications band or other type of critical frequency band are at risk for interference from D2D transmissions carried out in an adjacent frequency band.

Figure 4:
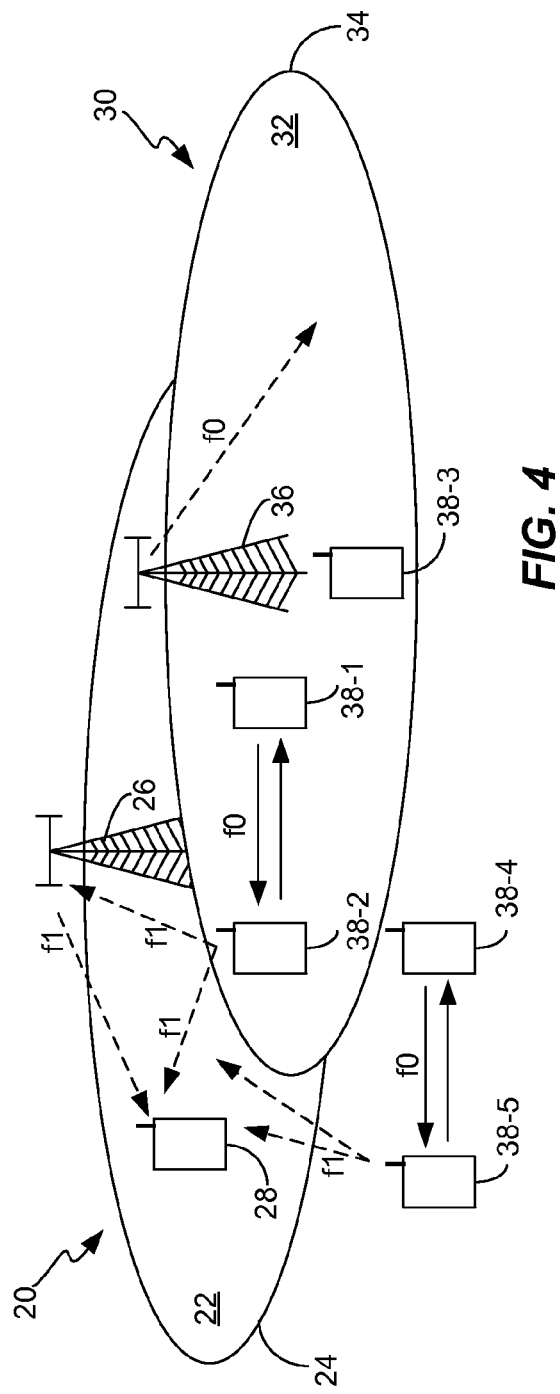
FIG. 4 is a block diagram of a communication network and wireless devices configured according to the teachings herein, shown in context with another network, e.g., a cellular communications network that is at risk for interference.

Consider FIG. 4, for example. One sees a communication network 30, which by way of non-limiting example comprises an NSPS network. The communication network 30 operates in a frequency band f0 and supports D2D communications within that frequency band. The network 30 has a coverage area 32, e.g., a cell, having a coverage border 34 that extends into or overlaps with the coverage area 22 of a cellular communications network 20, such as introduced in FIG. 2. The cellular communications network 20 operates in a frequency band f1, which is adjacent to the frequency band f0 and is therefore vulnerable to interference from the D2D transmissions carried out in the f0 frequency band, depending, of course, upon a number of variables, which include the extent of spectral leakage—out-of-band interference—associated with the D2D transmissions.

The network 30 includes one or more coverage areas 32 and one or more base stations 36—with only one coverage area 32 and one base station 36 shown for ease of illustration. The network 30 supports communications with a number of wireless devices 38, at least one of which is configured according to the teachings herein. For convenience, it may be assumed that all of the illustrated example wireless devices 38, i.e., 38-1 through 38-5, are configured to mitigate interference risks arising from D2D transmissions, as taught herein. Thus, the reference number 38 will be used generically in the singular sense to refer to a given "wireless device 18" and in the plural sense to refer to given "wireless devices 18."

In the example context of FIG. 4, one sees that a wireless device 28 operating within the coverage area 22 of the network 20 may be vulnerable to interference arising from D2D transmissions occurring between the wireless devices 38-1 and 38-2, which are in the network coverage area 32 of the network 30. In a particular example, the uplink cellular communications between the wireless device 28 and the base station 26 are vulnerable to interference arising from D2D transmissions between the wireless devices 38-1 and 38-2. Further, it may be that additional wireless devices 38 engage in D2D communications that risk interfering with the cellular uplink the communication network 20.

For example, the diagram depicts the wireless devices 38-4 and 38-5 as being engaged in D2D communications. Unlike the wireless devices 38-1 and 38-2, however, the D2D communication scenario involving the wireless devices 38-4 and 38-5 is an out-of-network coverage scenario. The teachings herein address interference risk mitigation in both scenarios, as is described in various examples in this disclosure.

Figure 5:
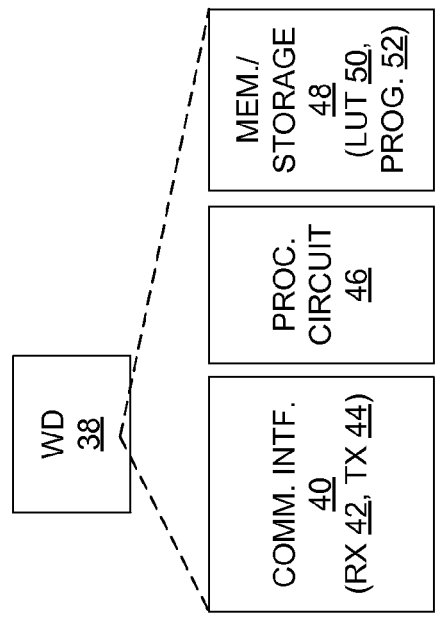
FIG. 5 is a block diagram of a wireless device configured to mitigate interference risks arising from D2D transmissions, according to one embodiment.

FIG. 5 illustrates an example embodiment of a given wireless device 38, which is configured to mitigate interference risks arising from its D2D transmissions. The wireless device 38 includes a communication interface 40, e.g., a transceiver comprising a receiver 42 and a transmitter 44, along with an associated processing circuit 46 and memory/storage 48.

The transceiver 42, 44 is configured for operation according to the protocols and air interface requirements of the communication network 30, including being configured for D2D communications in a first frequency band. In turn, the processing circuit 46 is configured to select a transmission setting to use for a D2D transmission from the transceiver circuit 42, 44. In particular, the processing circuit 46 is configured to determine in a first case that there is not an interference risk from the D2D transmission with respect to a critical frequency band, and to determine in a second case that there is an interference risk. In the first case, the processing circuit 46 selects a first transmission setting for the D2D transmission and in the second case the processing circuit 46 selects a second transmission setting for the D2D transmission.

As compared to the first transmission setting, the second transmission setting is configured to reduce possible out-of-band interference arising from the D2D transmission. The first and the second transmission settings differ with respect to at least one of: transmit power levels and time/frequency resource allocations. For example, the second transmission setting comprises at least one of: a second transmission power level that is lower than a first transmission power level comprised by the first transmission setting, and second time/frequency resources that are a subset of first time/frequency resources comprised by the first transmission setting. That is, the second transmission setting may be a lower transmit power setting than would be used according to the first transmission setting and/or may be a time/frequency resource allocation that uses a subset of the time/frequency resources that would be used according to the first transmission setting.

In one example, a bandwidth of the second time/frequency resources is substantially centered within a bandwidth of the first time/frequency resources. This centering "concentrates the transmit power of the wireless device 38 centrally within the bandwidth represented by the first time/frequency resources. In turn, that centralization tends to reduce the out-of-band spectral leakage into any adjacent critical frequency band at issue.

In the same or other embodiments, the processing circuit 46 is configured to select, as the second transmission setting, a transmit power level of the wireless device 38 that is based on a defined spectral leakage mask, which defines a threshold for out-of-band transmit power. An exemplary spectral leakage mask is shown in FIG. 10. Because the dominating non-linearities in the power amplifier, PA, used in the transmitter 44 of the wireless device 38 is based on third and fifth order terms, a leakage mask will typically appear as in the figure with a first leakage of BW=BW outside the pass band—possibly with a small transition band of $\delta\_1 \ll BW$ X1 dB below the pass band—and a second leakage of BW=BW outside that X2+X1 dB below the pass band—again with a small transition band $\delta\_2 \ll BW$.

In the same or other embodiments, the processing circuit 46 is configured to decide whether the first case or the second case applies, based on being configured to determine from a lookup table 50 stored in the wireless device 38 whether or not there is a critical frequency band adjacent to the first frequency band. That is, in one or more embodiments, the processing circuit 46 decides that the first case applies responsive to determining that the lookup table 50 indicates that there is no critical frequency band adjacent to the first frequency band being used for D2D communications. Conversely, the processing circuit 46 decides that the second case applies responsive to determining that the lookup table 50 indicates that there is a critical frequency band adjacent to the first frequency band being used for D2D communications.

It will be appreciated that the lookup table 50 is indexed, for example, as a function of the current frequency band being used for the D2D transmissions. That is, assume that the first frequency band is "Band X." Correspondingly, the processing circuit 46 indexes into the lookup table 50, to find the entry or entries for Band X, which entries may be logical flags or other indicators that indicate as to whether or not there are any adjacent critical frequency bands.

In other embodiments, the processing circuit 46 performs a more sophisticated analysis when deciding whether the first case or the second case applies to its selection of the transmission setting. For example, in some embodiments, the processing circuit 46 is configured to determine whether the first case or the second case applies based on, if the lookup table 50 indicates that there is a critical frequency band adjacent to the first frequency band, being configured to determine whether or not the critical frequency band adjacent to the first frequency band is active. The processing circuit 46 decides that the first case applies if the critical frequency band is determined not to be active and decides that the second case applies if the critical frequency band is determined to be active.

Further sophistication is contemplated with respect to how the second transmission setting is determined. For example, in the second case, the processing circuit 46 in some embodiments is configured to set, as the second transmission setting, a transmit power level of the wireless device 38 for the D2D transmission, based on a received signal level detected by the wireless device 18 for a downlink carrier associated with an adjacent cellular communication band, as the critical frequency band. In at least one such embodiment, the processing circuit 46 is configured to determine the received signal level from a synchronization signal, like Primary Synchronization Signals/Secondary Synchronization Signals in LTE, or a pilot signal (Common Reference Signals in LTE) detected by the wireless device 38 on the downlink carrier.

Still further, in some embodiments, in the second case, the processing circuit 46 is configured to detect a time or frequency reference of a downlink carrier associated with an adjacent cellular communication band, as the critical frequency band. Correspondingly, the processing circuit 46 is configured to adapt, as the second transmission setting, time/frequency resources allocated for the D2D transmission, in relation to the detected time or frequency, to avoid alignment between the D2D transmission and a transmission in the cellular communication band.

In the same or further embodiments, with respect to the communication network 30 operating in the first frequency band, the processing circuit 46 is configured to determine whether the wireless device 38 is in network coverage or out-of-network coverage. Correspondingly, the processing circuit 46 is configured to use pre-configured settings as the first and second transmission settings when the wireless device 38 is determined to be out-of-network coverage, and to use network-configured settings as the first and second transmission settings when the wireless device 38 is determined to be in network coverage. That is, the first and second transmission settings may be determined in whole or in part by the network 30, during periods when the wireless device 38 is operating within network coverage. Conversely, the first and second transmission settings may be determined from pre-configured values when the wireless device 38 is operating outside of network coverage. These pre-configured values may be default values stored in the wireless device 38, or they may be previously signaled values from the network 30.

In any case, in one or more embodiments, the contemplated D2D transmission uses a first carrier frequency in the first frequency band and the processing circuit 46 is configured to determine that the first case applies responsive to determining that there is not a critical transmission present on a second carrier frequency close to the first carrier frequency. Conversely, the processing circuit 46 determines that the second case applies responsive to determining that there is a critical transmission present on a second carrier frequency close to the first carrier frequency.

The determination as to whether a critical transmission is or is not present on an adjacent carrier frequency is performed according to any of the techniques disclosed herein. Of further note, in at least one example case, the first frequency band is a National Security Public Safety, NSPS, uplink carrier/resource in Band 14 at 788-798 MHz, and the critical frequency band is 3GPP Band 13, with the uplink at 777-787 MHz.

Figure 6:
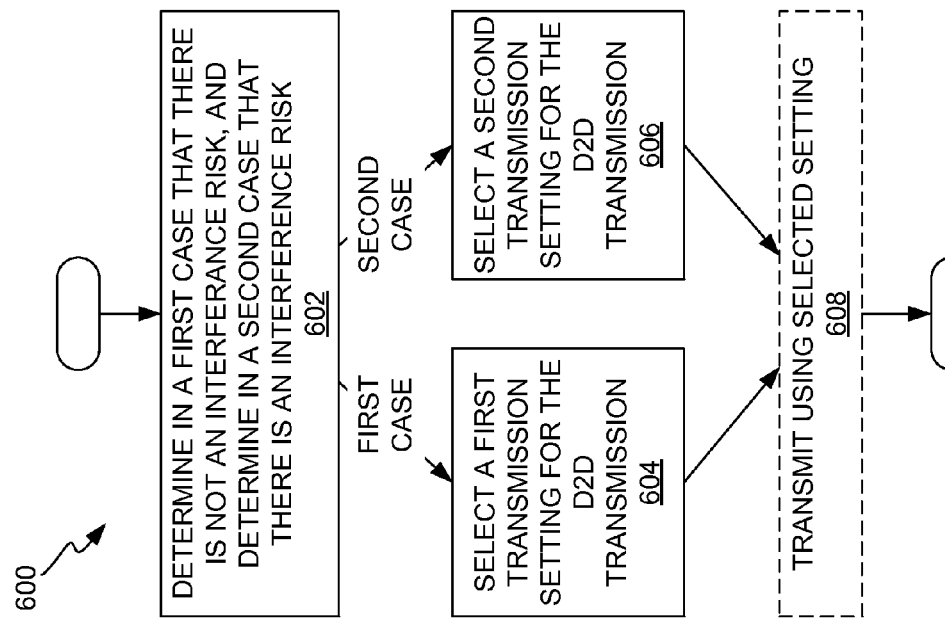

FIG. 6 illustrates a method 600 of processing, such as may be implemented by a wireless device 38, based on the appropriate configuration of fixed circuitry, programmed circuitry, or a mix of both fixed and programmed circuitry. In some embodiments, the processing circuit 46 of the wireless device 38 comprises a microprocessor-based circuit, or other digital processing circuitry, such as implemented via one or more DSPs, FPGAs, ASICs, etc. In at least one such embodiment, the digital processing circuitry comprising the processing circuit 46 is specially adapted to carry out the method 600 or variations thereof, based on its execution of the computer program instructions comprising a computer program 52, such as shown in FIG. 5. In such examples, the memory/storage 48 comprises FLASH, EEPROM, or other non-volatile computer-readable medium that provides non-transitory storage for the computer program 52, for execution by the processing circuit 46.

Thus, in one or more embodiments herein a computer-readable storage medium has stored thereon a computer program for execution by a processing circuit of a wireless device that is configured for D2D communications in a first frequency band. In an example case, the storage medium comprises the memory/storage 48 of a wireless device 38 such as illustrated in FIG. 5, and the processing circuit comprises the processing circuit 46 of the wireless device 38. The computer program comprises program instructions to select a transmission setting to use for a D2D transmission by the wireless device 38, including program instructions to: determine in a first case that there is not an interference risk from the D2D transmission with respect to a critical frequency band, and determine in a second case that there is an interference risk; in the first case, select a first transmission setting for the D2D transmission; and in the second case, select a second transmission setting for the D2D transmission, wherein, as compared to the first transmission setting, the second transmission setting is configured to reduce possible out-of-band interference arising from the D2D transmission.

Turning back to FIG. 6, it will be appreciated that one or more of the illustrated processing steps may be performed in an order other than that suggested. Additionally, or alternatively, one or more of the illustrated processing steps may be performed in parallel and/or in conjunction with other processing operations ongoing at the wireless device 38. Still further, the method 600 may be performed on a triggered basis, such as whenever the current frequency band of the wireless device 38 is changed. Additionally, particularly in instances where the processing circuit 46 looks for actual activity in a critical frequency band as the basis for deciding whether the first or second case applies to selecting the transmission setting for any given D2D transmission or series of transmissions, the method 600 may be performed repeatedly, with each repetition including an attempt by the wireless device 38 to detect whether there is any communications activity in the critical frequency band at issue.

With these qualifications in mind, FIG. 6 illustrates a method 600 for selecting a transmission setting in a wireless device 38 to use for a D2D transmission from the wireless device 38 in a first frequency band. The method 600 includes determining (Block 602) in a first case that there is not an interference risk from the D2D transmission with respect to a critical frequency band, and determining in a second case that there is an interference risk. That is, for a given D2D transmission, the wireless device 38 decides whether the first case applies or whether the second case applies, to controlling the selection of the transmission setting to use for the D2D transmission.

Figure 7:
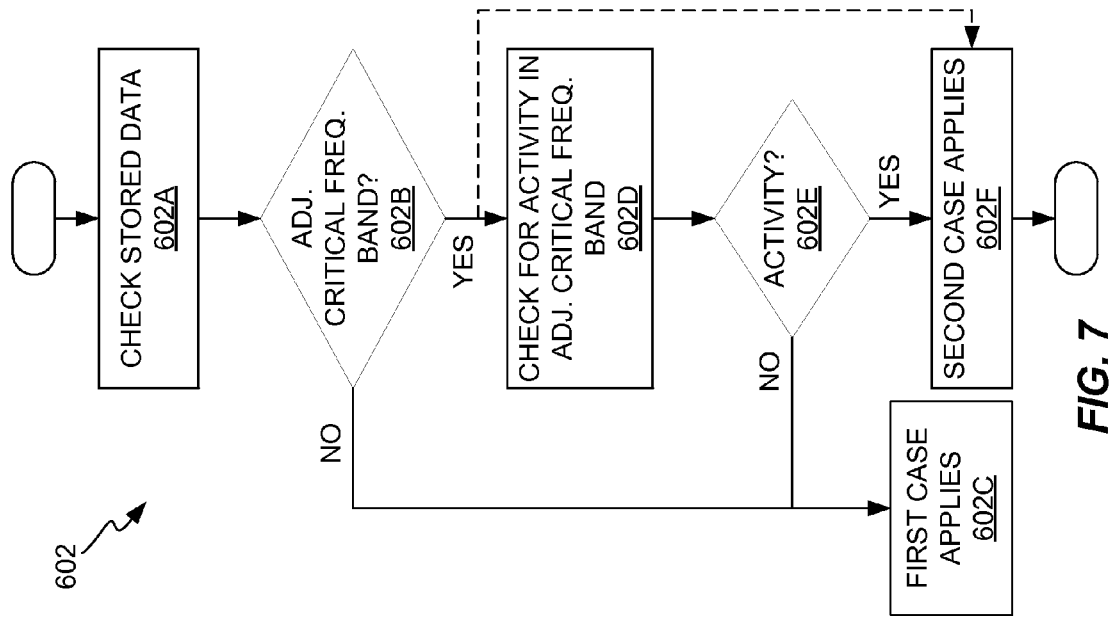
FIGS. 6 and 7 are block diagrams of a method of mitigating interference risks arising from D2D transmissions, according to one embodiment.

FIG. 7 illustrates example details for Block 602, with respect to a given D2D transmission in a first frequency band. The sub-steps comprising the Block 602 operations in the illustrated example include checking (Block 602A) stored data—e.g., checking the aforementioned lookup table 50. If the stored data indicates that there is not an adjacent critical frequency band (NO from Block 602B), then the processing circuit 46 of the wireless device 38 decides that the first case applies. If, on the other hand, the stored data indicates that there is an adjacent critical frequency band (YES from Block 602B), processing in one embodiment—the dashed line from YES—proceeds to Block 602F, in which the processing circuit 46 decides that that second case applies. In another embodiment, rather than immediately deciding that the second case applies, the YES line of processing from Block 602B proceeds to Block 602D, wherein the processing circuit 46 checks for activity in the adjacent critical frequency band that was indicated as being present by the stored data.

Thus, the decision as to whether the first or second case applies is conditioned on the stored data indicating that a critical frequency band is adjacent to the first frequency band, which shall be understood as being whatever the current frequency band of operation is for the wireless device 38, and is further conditioned on determining whether the adjacent critical frequency band is active. If the adjacent critical frequency band is detected as being active—YES from Block 602E—then the processing circuit 46 decides that the second case applies (Block 602F). If the adjacent critical frequency band is detected as inactive—NO from Block 602E—then the processing circuit 46 decides that the first case applies (Block 602C).

Turning back to FIG. 6, in the first case, the method 600 includes selecting (Block 604) a first transmission setting for the D2D transmission, and, in the second case, includes selecting (Block 606) a second transmission setting for the D2D transmission. As compared to the first transmission setting, the second transmission setting is configured to reduce out-of-band interference arising from the D2D transmission. The wireless device 38 transmits (Block 608) using the selected transmission setting.

Figure 8:
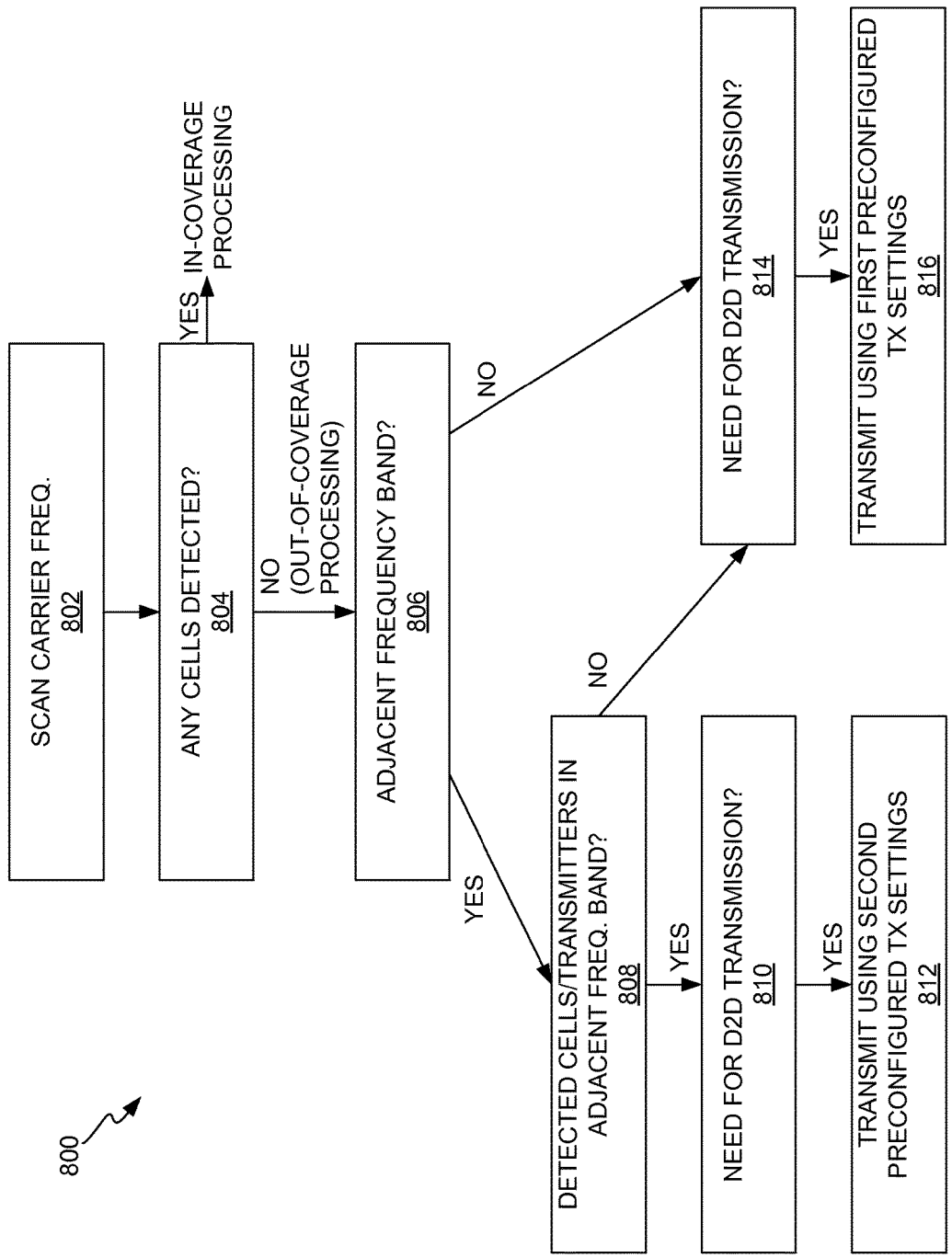

FIG. 8 illustrates another example embodiment of processing as taught herein for conditional mitigation of interference with respect to a D2D transmission. FIG. 8 may be understood as a detailed example of the method 600 introduced in FIG. 6. In the context of FIG. 8, a wireless device 38 is configured to operate as an NSPS device—i.e., it is configured for D2D transmission and reception on an NSPS carrier.

The method 800 includes, for a determined NSPS carrier, searching (Block 802) the NSPS carrier for synchronization signals transmitted from an NSPS cell. For example, the wireless device 38 looks for DL synch signals using ordinary cell search procedures, such as are known from LTE. The DL synch signals comprise, for example, Primary Synchronization Signals, PSS, and Secondary Synchronization Signals, SSS. The NSPS cell may be controlled by an NSPS base station 36 or CH, as described earlier. Additionally, or alternatively, the scan may search for UL D2D synchronization signals.

Based on the scanning performed in Block 802, the wireless device 38 determines whether any NSPS cell or CH have been detected (Block 804)). If an NSPS cell has been detected, then the wireless device 38 performs in-coverage processing, including connecting to and registering with the cell/CH. Such details are not of particular interest in this example. Of more interest is the out-of-coverage case (NO from Block 804). In case no cell/CH is detected, the wireless device 38 deems that it is out of network coverage.

For example, the wireless device 38 "declares" the out-of-coverage case if any one or more of the following occurs: the wireless device 38 fails to detect PSS/SSS or CH sync signals; the wireless device 38 fails to read Master Information Block, MIB/System Information Block, SIB, information from a cell; or the received cell-specific reference signal, CRS, level or quality is below a threshold associated with reliable MIB/SIB detection. In general terms, this evaluation concerns the received strength or quality of the base station common pilot signal. The reference signal level may be denoted as the Reference Signal Received Power, RSRP, or its quality may be denoted as the Reference Signal Received Quality, RSRQ. Additionally or alternatively, the wireless device 38 may declare that it is out of network coverage upon failing to receive a Random Access Response from an NSPS base station or CH.

If the wireless device 38 has decided that it is outside of network coverage, the wireless device 38 further determines whether there is a critical frequency band adjacent to the NSPS carrier (Block 806). This may be done by looking in a lookup table 50 and utilizing a standard to see whether any critical frequency band is immediately adjacent to the NSPS carrier frequency or otherwise so close in frequency that significant interference may be induced in the critical frequency band. A "critical frequency band" is, by way of non-limiting example, a frequency band used by a 3GPP cellular system, a satellite system or a military communication or radar communication system.

For instance, if the NSPS carrier on which the wireless device 38 operates uses 3GPP Band 14 and hence D2D transmission is made on UL frequencies associated with the 788-798 MHz UL in Band 14, then the 777-787 MHz UL of 3GPP Band 13 is an adjacent critical frequency band. Although the extent of any actual interference in Band 13 depends on a number of variables, there is an appreciable risk of interference from the D2D transmissions with respect to UL communications in Band 13. Of course, other examples frequency bands have the same issues. If no critical frequency band is adjacent to the NSPS UL carrier (NO from Block 806), then the wireless device 38 determines whether there is a need for a D2D transmission (Block 814). If so, the wireless device 38 performs a D2D transmission (Block 816) using a first transmission setting comprising a first set of time/frequency resources and a first transmit power. For example, the first transmit power is selected as 31 dBm. The D2D transmission of interest here comprises, by way of non-limiting example, a broadcast, a beacon, a discovery signal, a unicast transmission, a groupcast transmission, etc.

On the other hand, if the wireless device 38 determines that there is a critical frequency band adjacent to the NSPS carrier (YES from Block 806), the wireless device 38 further determines whether any transmissions are present in the adjacent band (Block 808). Different methods for determination are contemplated. For example, the wireless device 38 may detect that the adjacent critical frequency band is active based on Received Signal Strength Indicator, RSSI, scanning of the adjacent frequency band. In another example, the wireless device 38 detects whether the adjacent frequency band is active by determining whether synchronization/pilot signals are transmitted from a network node on a DL carrier/resource associated with the UL carrier that is adjacent to the NSPS UL carrier. Here, it will be understood that the wireless device 38 may be programmed with or otherwise provided with DL and UL frequency information for any given number of frequency bands, and may use such information to configure its activity scanning.

If no such indication of transmission activity in the adjacent frequency band is detected (NO from Block 808), the processing of Blocks 814 and 816 are invoked. However, if the wireless device 38 detected the adjacent frequency band as being active (YES from Block 808), and if the wireless device 38 determines that a D2D transmission is needed (YES from Block 810), the wireless device 38 performs (Block 812) that D2D transmission using a second transmission setting. The second transmission setting differs from the first transmission setting in terms of transmit power and/or in terms of the time/frequency resources allocated for the transmission. In one example, the second transmission setting comprises a second set of time/frequency resources and a second transmit power.

The second transmission setting is configured to reduce the risk for interference in the adjacent frequency band, as arises from spectral leakage from the transmitter 44 of the wireless device 38. The second transmission setting is different from the first transmission setting, either in terms of the allocated time/frequency resources, the transmission power, or both. Where the first and second transmission settings are based on pre-configured values or settings, the time/frequency resources of the second transmission setting are pre-configured and they may be the same as the time/frequency resources preconfigured in the first transmission setting, or they may comprise a subset of the first pre-configured time/frequency resources. In one example, the second set of time/frequency resources has a smaller bandwidth than the first set of time/frequency resources. In a particular configuration contemplated herein, the time/frequency resources comprising the second transmission setting are more "central" than the time/frequency resources comprising the first transmission setting, i.e. they are at or closer to the center of the system bandwidth.

Furthermore, in some embodiments, if the first transmission setting comprises a first transmit power level, and the second transmission setting comprises a second transmit power level, the second transmit power level is lower than the first transmit power level. In one such example, the first transmit power level has a preconfigured value of 31 dBm and the second transmit power level has a preconfigured value of 23 dBm. The same approach can be used for other power levels, such as where the wireless device 38 operates within network coverage and the first transmit power level is a first network-set or network-assisted value, and the second transmit power level is a lower, second network-set or network-assisted value, or is a defined offset from the first transmit power level.

Additionally, or alternatively, the second transmit power level may be dependent on the first or second set of time/frequency resources. For instance, if the resources are configured at the band edge, the second transmit power level may be lower than if resources are configured at the center of the system bandwidth, e.g., 15 dBm versus 23 dBm. The second transmit power level may also be determined based on the received signal level of, for instance detected sync signals or pilot signals (CRS), on the DL associated with the UL carrier/resources in the adjacent frequency band.

If the presence of an adjacent cell is used as the trigger for deciding that the second case applies, then signal level of such signals provides a good reference for estimating the second transmit power level needed to have acceptable out-of-band leakage levels. The second transmit power level may also be a combined function of received power level and the time/frequency resources used. Thus, in one or more embodiments, the second transmit power level is adapted such that spectral leakage in the adjacent frequency band is minimized, thereby reducing the risk for interference. The transmit power level back off may be determined by the 3GPP standard or by the wireless device 38 taking into account the spectral leakage performance of the wireless device 38, which is known, e.g., from configuration information stored in the wireless device 38. In such approaches, a wireless device 38 having lower leakage can use a higher transmit power level in the second case, than could another wireless device 38 having a higher leakage. The requirement here can thus be understood as having the second transmission setting configured such that the spectral density, in dB/Hz, of the undesired leakage emission in the adjacent band is below a certain threshold. Own spectral leakage performance may in some embodiments be determined from capability information known or obtained for the wireless device 38.

As previously noted, the second transmit power level may be a function of a leakage mask. Here, the second transmit power level is configured so that out-of-band transmit power remains below a certain threshold.

Further, to the extent that the second transmission setting comprises time/frequency resource allocation, such allocation in one or more embodiments is adapted in relation to a detected time and/or frequency reference of the DL associated to the UL carrier/resources adjacent to the NSPS carrier. The objective of such adaptation is to avoid alignment between the NSPS transmissions subject to interference from the D2D transmission(s)—e.g., specific uplink cellular transmissions in the adjacent carrier. One example of the latter is random access transmissions, which only are allowed at specific time/frequency resources in the cellular communication uplink. Another example of a specific transmission for which D2D transmission alignment is avoided is uplink channel sounding. In uplink channel sounding, wireless devices operating in the adjacent frequency band transmit configured pilot (or reference) sequences at specific time/frequency resources. Of further note, the adaptations used for the time/frequency resources allocated in the second transmission setting may facilitate scheduling in the cellular UL of the adjacent frequency band. For example, an associated cellular base station monitors UL interference as input to the cellular scheduling of data, and also for certain other signals such as uplink channel sounding. By adapting the second transmission setting to align these, the cellular base station will have an easier task of find good time/frequency resources for UL cellular scheduling and for UL channel sounding, which could be configured with an awareness of the second transmission setting.

Thus, with a sharing of the UL frequency band between UL cellular usage and D2D usage, some type of timing alignment provides significant advantages. In at least one embodiment, a network node, such as the cellular base station 26 introduced in FIG. 4, is configured to monitor UL interference, e.g., with respect to data transmissions and/or uplink channel sounding, and to output the results of that monitoring, or information derived from that monitoring, for use in adapting the second transmission setting. The information output by the cellular base station or other cellular network node is termed "interference information" and it indicates, for example timing and/or frequency information for the observed interference.

For example, such a network node is configured in one or more embodiments to share timing information with a D2D node or device, e.g., the base station 36 or a device 38, to thereby enable adaptation of the second transmission setting—e.g., to adjust time and/or frequency resource allocations to reduce interference caused in the cellular network by D2D transmissions made using the second transmission setting. Additionally or alternatively the information identifies or otherwise indicates the time/frequency resources where the D2D interference is seen. Correspondingly, the D2D node or device is configured to adapt the second transmission setting based on the interference information received from the cellular network node.

FIG. 9 illustrates another example processing method 900, which may be understood as a detailed example of the method 600. Here, the scenario of interest is where the wireless device 38 determines that it is operating in network coverage. Thus, the method 900 "begins" with the wireless device 38 determining whether it is camping on a (D2D) carrier (Block 902). If not, processing continues with the out-of-network coverage details covered in FIG. 8. If so (YES from Block 902), processing continues with the wireless device determining (Block 904) whether there is an adjacent frequency band—i.e., determining whether there is a critical frequency band at risk for interference from its D2D transmissions. That is, in some literal sense, there will always be frequencies adjacent to the first frequency band used by the wireless device 38 for D2D transmissions and the more critical question is whether that adjacent frequency band is known or detected as being used for critical communications, e.g., cellular, emergency, etc.

If the wireless device 38 decides that there is no critical frequency band adjacent to the first frequency band associated with its D2D transmissions (NO from Block 904), processing continues with the wireless device 38 determining (Block 212) whether there is a need for a D2D transmission. If so (YES from Block 212), processing continues with the wireless device 38 making a D2D transmission using first configured transmission settings. However, if there is an adjacent critical frequency band (YES from Block 904), processing continues with the wireless device 38 determining whether the adjacent critical frequency band is active—e.g., by determining whether any cells/transmitters are detected in the adjacent critical frequency band (Block 906).

If not (NO from Block 906), processing continues with Block 912 and 914. If so (YES from Block 906), processing continues with the wireless device 38 determining whether there is a need for a D2D transmission (Block 908). If so (YES from Block 908), the processing continues with the wireless device 38 making a D2D transmission using second configured transmission settings (Block 910).

Thus, FIG. 9 can be understood as illustrating an example method for the wireless device 38 deciding whether the first or the second case applies. If the first case applies, the wireless device 38 uses first configured transmission settings as the "first transmission setting" for a D2D transmission (Block 914). If the second case applies, the wireless device 38 uses second configured transmission settings as the "second transmission setting" for the D2D transmission (Block 910). As compared to the out-of-network coverage case of FIG. 8, the first and second transmission settings here are "configured" settings in the sense that the network 30 may wholly or partly determine the values defining the first and second transmission settings. In contrast, the first and second transmission settings at issue in Blocks 816 and 812, respectively, in FIG. 8, are "pre-configured" settings in the sense that the wireless device 38 is out of network coverage.

In further example embodiment details, a wireless device 38 according to the methods and apparatuses disclosed herein performs a D2D transmission, e.g., using UL resources on an NSPS carrier having a first carrier frequency and a first system bandwidth. According to this example, the wireless device 38 determines if any critical transmission is present on a second carrier frequency adjacent to the NSPS first carrier frequency—e.g., it determines whether a lookup table 50 indicates whether a critical frequency band is adjacent to the first NSPS carrier frequency and/or determines whether there is an adjacent and active critical frequency band.

If the wireless device 38 decides that no such critical transmissions are present, it performs a D2D transmission on a first configured set of time/frequency resources using a first transmit power, and otherwise performs the D2D transmission on a second configured set of time/frequency resources using a second transmit power. The wireless device 38 may perform the prior initiating step of determining whether it is in or out-of-network coverage relative to a remote cellular node/cluster head on the first carrier frequency. If it is out-of-network coverage, the wireless device 38 uses preconfigured first and second resources, and if it is in network coverage, the wireless device 38 uses configured—e.g., network-selected or assisted—first and second resources.

The wireless device 38 in one or more embodiments determines whether there is any critical transmission subject to interference from the D2D transmission, based on detecting any one or more of: a synchronization signal in an adjacent frequency band, and a broadcast or pilot signal on a DL carrier in the adjacent frequency band. Further, the second transmit power, when the second transmission setting is selected, may be based on the wireless device 38 determining a received signal level of a synchronization signal or pilot signal on the DL carrier in the adjacent frequency band. Additionally, or alternatively, the second transmit power is based on a requirement on that the spectral leakage density on a carrier frequency in the adjacent frequency band be below a certain threshold. Still further, in the same or other embodiments, the second transmit power level is a function of second or first preconfigured time/frequency resources.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method for selecting a transmission setting in a wireless device to use for a Device-to-Device, D2D, transmission from the wireless device in a first frequency band, the method comprising:
   determining in a first case that there is not an interference risk from the D2D transmission with respect to a critical frequency band, and determining in a second case that there is an interference risk;
   in the first case, selecting a first transmission setting for the D2D transmission; and
   in the second case, selecting a second transmission setting for the D2D transmission, wherein, as compared to the first transmission setting, the second transmission setting is configured to reduce possible out-of-band interference arising from the D2D transmission.

2. The method of claim 1, wherein the first and the second transmission settings differ with respect to at least one of: transmit power levels and time/frequency resource allocations.

3. The method of claim 1, wherein the second transmission setting comprises at least one of:
   a second transmission power level that is lower than a first transmission power level comprised by the first transmission setting; and
   second time/frequency resources that are a subset of first time/frequency resources comprised by the first transmission setting.

4. The method of claim 3, wherein a bandwidth of the second time/frequency resources is substantially centered within a bandwidth of the first time/frequency resources.

5. The method of claim 1, wherein, in the second case, selecting the second transmission setting comprises setting a transmit power level of the wireless device based on a defined spectral leakage mask that defines a threshold for out-of-band transmit power.

6. The method of claim 1, wherein said determining in the first case comprises determining from a lookup table stored in the wireless device that there is no critical frequency band adjacent to the first frequency band, and wherein said determining in the second case comprises determining from the lookup table that there is a critical frequency band adjacent to the first frequency band.

7. The method of claim 6, wherein determining in the second case further comprises determining whether or not the critical frequency band adjacent to the first frequency band is active and determining that there is an interference risk if the critical frequency band adjacent to the first frequency band is active.

8. The method of claim 1, wherein, in the second case, selecting the second transmission setting comprises setting a transmit power level of the wireless device for the D2D transmission based on a received signal level detected by the wireless device for a downlink carrier associated with an adjacent cellular communication band, as said critical frequency band.

9. The method of claim 8, further comprising determining the received signal level from a synchronization signal or a pilot signal detected by the wireless device on the downlink carrier.

10. The method of claim 1, further comprising, in the second case, detecting a time or frequency reference of a downlink carrier associated with an adjacent cellular communication band, as said critical frequency band, and wherein selecting the second transmission setting comprises adapting time/frequency resources allocated for the D2D transmission, in relation to the detected time or frequency, to avoid alignment between the D2D transmission and a transmission in the cellular communication band.

11. The method of claim 1, wherein the first frequency band is a National Security Public Safety, NSPS, uplink carrier/resource Band 14 at 788-798 MHz, and wherein the critical frequency band is 3GPP Band 13 uplink at 777-787 MHz.

12. The method of claim 1, wherein the D2D transmission uses a first carrier frequency in the first frequency band and wherein said determining in the first case comprises determining that there is not a critical transmission present on a second carrier frequency close to the first carrier frequency, and wherein said determining in the second case comprises determining that there is a critical transmission present on a second carrier frequency close to the first carrier frequency.

13. The method of claim 1, further comprising, with respect to a network operating in the first frequency band:
   determining whether the wireless device is in network coverage or out-of-network coverage; and
   using pre-configured settings as the first and second transmission settings when the wireless device is determined to be out-of-network coverage; and
   using network-configured settings as the first and second transmission settings when the wireless device is determined to be in network coverage.

14. The method of claim 1, further comprising receiving interference information indicating interference seen in the critical frequency band as a consequence of one or more D2D transmissions using the second setting, and adapting the second setting responsive to the interference information.

15. A wireless device comprising:
   a transceiver circuit configured for Device-to-Device, D2D, communications in first frequency band; and
   a processing circuit configured to select a transmission setting to use for a D2D transmission from the transceiver circuit, based on the processing circuit being configured to:
      determine in a first case that there is not an interference risk from the D2D transmission with respect to a critical frequency band, and determine in a second case that there is an interference risk;
      in the first case, select a first transmission setting for the D2D transmission; and
      in the second case, select a second transmission setting for the D2D transmission, wherein, as compared to the first transmission setting, the second transmission setting is configured to reduce possible out-of-band interference arising from the D2D transmission.

16. The wireless device of claim 15, wherein the first and the second transmission settings differ with respect to at least one of: transmit power levels and time/frequency resource allocations.

17. The wireless device of claim 15, wherein the second transmission setting comprises at least one of:
   a second transmission power level that is lower than a first transmission power level comprised by the first transmission setting; and
   second time/frequency resources that are a subset of first time/frequency resources comprised by the first transmission setting.

18. The wireless device of claim 17, wherein a bandwidth of the second time/frequency resources is substantially centered within a bandwidth of the first time/frequency resources.

19. The wireless device of claim 15, wherein, in the second case, the processing circuit is configured to select, as said second transmission setting, a transmit power level of the wireless device that is based on a defined spectral leakage mask, which defines a threshold for out-of-band transmit power.

20. The wireless device of claim 15, wherein the processing circuit is configured to decide whether the first case or the second case applies, based on being configured to determine from a lookup table stored in the wireless device whether or not there is a critical frequency band adjacent to the first frequency band.

21. The wireless device of claim 20, wherein the processing circuit is further configured to determine whether the first case or the second case applies based on, if the lookup table indicates that there is a critical frequency band adjacent to the first frequency band, being configured to determine whether or not the critical frequency band adjacent to the first frequency band is active, and to decide that the first case applies if the critical frequency band is determined not to be active and to decide that the second case applies if the critical frequency band is determined to be active.

22. The wireless device of claim 15, wherein, in the second case, the processing circuit is configured to set, as said second transmission setting, a transmit power level of the wireless device for the D2D transmission based on a received signal level detected by the wireless device for a downlink carrier associated with an adjacent cellular communication band, as said critical frequency band.

23. The wireless device of claim 22, wherein the processing circuit is configured to determine the received signal level from a synchronization signal or a pilot signal detected by the wireless device on the downlink carrier.

24. The wireless device of claim 15, wherein, in the second case, the processing circuit is configured to detect a time or frequency reference of a downlink carrier associated with an adjacent cellular communication band, as said critical frequency band, and to adapt, as said second transmission setting, time/frequency resources allocated for the D2D transmission, in relation to the detected time or frequency, to avoid alignment between the D2D transmission and a transmission in the cellular communication band.

25. The wireless device of claim 15, wherein the first frequency band is a National Security Public Safety, NSPS, uplink carrier/resource Band 14 at 788-798 MHz, and wherein the critical frequency band is 3GPP Band 13 uplink at 777-787 MHz.

26. The wireless device of claim 15, wherein the D2D transmission uses a first carrier frequency in the first frequency band and wherein the processing circuit is configured to determine that the first case applies responsive to determining that there is not a critical transmission present on a second carrier frequency close to the first carrier frequency, and to determine that the second case applies responsive to determining that there is a critical transmission present on a second carrier frequency close to the first carrier frequency.

27. The wireless device of claim 15, wherein, with respect to a network operating in the first frequency band, the processing circuit is configured to:

determine whether the wireless device is in network coverage or out-of-network coverage; and
use pre-configured settings as the first and second transmission settings when the wireless device is determined to be out-of-network coverage; and
use network-configured settings as the first and second transmission settings when the wireless device is determined to be in network coverage.

28. A non-transitory computer-readable storage medium, having stored thereon a computer program for execution by a processing circuit of a wireless device configured for Device-to-Device, D2D, communications in a first frequency band, said computer program comprising program instructions to select a transmission setting to use for a D2D transmission by the wireless device, including program instructions to:
determine in a first case that there is not an interference risk from the D2D transmission with respect to a critical frequency band, and determine in a second case that there is an interference risk;
in the first case, select a first transmission setting for the D2D transmission; and
in the second case, select a second transmission setting for the D2D transmission, wherein, as compared to the first transmission setting, the second transmission setting is configured to reduce possible out-of-band interference arising from the D2D transmission.

29. A non-transitory computer-readable storage medium, having stored thereon a computer program for execution by a processing circuit of a network node configured for operation in a wireless communication network, said computer program comprising program instructions to reduce interference experienced by the cellular communication network from Device-to-Device, D2D, transmissions in an adjacent frequency band, including program instructions to:
monitor interference in at least one of uplink data transmissions and uplink sounding signals;
generate interference information indicating timing and/or frequency information for observed interference, as determined from said monitoring; and
send the interference information to a D2D device or node associated with the D2D transmissions, to thereby enable the D2D device or node to adapt the D2D transmissions.

30. A method of reducing interference experienced by a cellular communication network from Device-to-Device, D2D, transmissions in an adjacent frequency band, said method implemented at a network node in the cellular communication network and comprising:
monitoring interference in at least one of uplink data transmissions and uplink sounding signals;
generating interference information indicating timing and/or frequency information for observed interference, as determined from said monitoring; and
sending the interference information to a D2D device or node associated with the D2D transmissions, to thereby enable the D2D device or node to adapt the D2D transmissions.

* * * * *